United States Patent [19]

Cornwall et al.

[11] 4,290,819

[45] Sep. 22, 1981

[54] METHOD AND COMPOSITION FOR THE REMOVAL OF PHENOLIC RESIN COATINGS FROM ALUMINUM

[75] Inventors: Edwin P. Cornwall; Walter Batiuk, both of Seattle, Wash.

[73] Assignee: The Boeing Company, Seattle, Wash.

[21] Appl. No.: 109,244

[22] Filed: Jan. 3, 1980

[51] Int. Cl.$^3$ ............... C23G 1/02; C11D 7/00; C23G 1/02

[52] U.S. Cl. ............... 134/3; 134/38; 252/142; 252/146; 427/156; 427/353; 428/443; 428/524

[58] Field of Search ............... 252/146, 142; 427/353, 427/156; 134/2, 3, 38; 428/443, 524

[56] References Cited

U.S. PATENT DOCUMENTS 3,349,036  10/1967  Campbell ............... 252/146 X
3,676,219   7/1972  Schroeder et al. ............... 252/146 X

*Primary Examiner*—Michael R. Lusignan
*Attorney, Agent, or Firm*—David L. Garrison; Robert Gullette

[57] ABSTRACT

A composition and process for the removal of phenolic resin composites from aluminum and its alloys which results in a minimum of corrosion to said metals. The process uses a solvent solution of nitric acid, a hexavalent chromium and incidental water in the proportions of about 0.01–0.12 moles of hexavalent chromium and 1–1.7 moles of $H_2O$ per mole $HNO_3$.

9 Claims, No Drawings

METHOD AND COMPOSITION FOR THE REMOVAL OF PHENOLIC RESIN COATINGS FROM ALUMINUM

BACKGROUND OF THE INVENTION

This invention is in the field of chemical cleaning compositions and methods of using the same. This invention further relates to chemical cleaning compositions and a process used for removing phenolic resin composites from aluminum and its alloys.

PRIOR ART

In the past, phenolic resin composites containing heat resistant fibers, such as asbestos, have proved very resistant to many types of solvents and chemical strippers. Those solvents and strippers presently known in the trade which are capable of lifting or dissolving a phenolic resin composite from an aluminum alloy substrate are also damaging to the alloy. This damage to aluminum alloys by traditional chemical solvents, especially those solvents containing sulfates, takes the form of intergranular attack and end grain pitting, and can result in catastropic failure of the aluminum part.

As a result of the above-mentioned corrosive effects, a part or apparatus made of an expensive alloy which is finished to close tolerances and which must have a phenolic resin composite removed from its surface can be rendered useless if immersed in these traditional solvents.

Expensive rocket booster cases constructed of an aluminum alloy and machined to close tolerances contain liners of heat and pressure laminated phenolic resin composites. Heretofore, these rocket booster cases have been virtually non-recoverable after one use because of the difficulty in separating the phenolic resin composite from the rocket booster case without producing unacceptable corrosion of the aluminum alloy.

In the instance of rocket booster cases, unacceptable corrosion is defined as intergranular attack exceeding 0.0002", end grain pitting exceeding 0.001" and a total etch rate exceeding 0.002", where the etch rate is defined as inches of metal removed per side, per hour when exposed to the solvent.

Before the present invention, methods such as mechanical scrubbing and pressurized steam cleaning were tried and proved ineffective. Even machining of the phenolic resin composite liner has been tried, but this was proven inadequate because the rocket booster cases could not be aligned sufficiently close to their original tooling axis to remove the phenolic liner without removing excessive amounts of the metal itself.

SUMMARY OF THE INVENTION

This invention provides a chemical composition and method of using the same which effectively removes a phenolic resin-asbestos composite liner from aluminum and its alloys with a minimum of etching or corrosion of the alloy surface exposed to the solvent. In particular, the cleaning composition of the present invention is capable of breaking the strongly cross-linked bonds of the phenyl six-carbon ring forming phenolic resins, while substantially preserving the surface integrity of the metallic alloy substrate free from excessive intergranular attack and end grain pitting.

The composition used consists essentially of nitric acid, a hexavalent chromium chosen from the group of: chromium trioxide and sodium dichromate and water in the proportions of 0.01-0.12 moles of the hexavalent chromium and 1-1.7 moles of $H_2O$ per mole of $HNO_3$.

This composition is heated and maintained in the range of 110° F. to 180° F. preferably at about 160° F. The aluminum alloy suitably masked or covered where no coating of the phenolic resin composite liner is present, is immersed for approximately one hour. After immersion, the remaining phenolic resin composite liner material can usually be rinsed from the aluminum substrate with pressurized water. If necessary, the immersion process may be repeated to remove any remaining coating. If the phenolic resin composite liner has been sufficiently removed, the aluminum alloy can be given a final water cleaning and then dried.

DESCRIPTION OF THE PREFERRED EMBODIMENT

In order to determine the effectiveness of various solvent solutions in the removal of phenolic resin-asbestos composite liners from aluminum conduits, tests were conducted as outlined in the table set forth below:

TABLE I

| | SOLVENT SCREENING TESTS | | | |
|---|---|---|---|---|
| | | ETCH RATE | | |
| TEST SOLUTION OR PROCEDURE | °F. TEMP. | PHENOLIC mils/side/hr. | ALUMINUM mils/side/hr. | RATIO P/A |
| Turco 5404[1] | room | 0 | 0 | — |
| Wyandotte lokrinse[2] | 140 to 160 | 0 | 0 | — |
| Fiberesin ES-1[3] | room | 0 | 0 | — |
| Oakite ANP[4] | room | 0 | .002 | — |
| Oakite EPA[5] | room | 0 | 0 | — |
| Methylene chloride | room | 0 | 0 | — |
| Acetone | room | 0 | 0 | — |
| Dry abrasive blast 150 grit alumina | room | 10% (wt.loss) | 0 | — |
| Hydrogen peroxide 30% | room | 0 | 0 | — |
| Liquid nitrogen | −320 | none | none | — |
| Teflon etchant (metallic sodium in tetrahydrofuran) | room | none | none | — |
| Nitric acid, molybdic acid and sodium dichromate | 135 | 0 | .26 | — |
| Nitric acid 70% | room | 0 | 0 | — |
| | 140 | 3 | 0 | — |

TABLE I-continued
SOLVENT SCREENING TESTS

| TEST SOLUTION OR PROCEDURE | °F. TEMP. | ETCH RATE PHENOLIC mils/side/hr. | ALUMINUM mils/side/hr. | RATIO P/A |
|---|---|---|---|---|
| | 240 | (wt.loss) 100 | 3.4 | 29.41 |
| Chromium trioxide | room | 0 | 0 | — |
| 4 lb/gal. | 180 | 0 | .3 | — |
| Chromium trioxide and nitric acid 5% by volume | 160 | slight etch | .06 | — |
| Nitric acid 70% plus chromium trioxide ($CrO_3$): | | | | |
| 200 gm/l | 160 | 3.7 | .16 | 23 |
| 150 gm/l | 150 | 5 | .15 | 33 |
| 100 gm/l | 120 | 2.1 | .06 | 35 |
| 100 gm/l | 160 | 7.5 | .22 | 34 |
| 50 gm/l | 155 | 3.3 | .18 | 18 |
| 25 gm/l | 110 | 1.7 | .045 | 38 |
| 25 gm/l | 150 | 2.2 | .17 | 13 |
| Nitric acid 70% plus sodium dichromate ($Na_2 Cr_2 O_7 \cdot 2H_2O$): | | | | |
| 50 gm/l | 105 | 1 | .017* | 60 |
| 50 gm/l | 160 | 1.7 | .29* | 6 |
| 100 gm/l | 105 | .8 | .040* | 20 |
| (Saturated, exact concentration not known) | 150 | 1.1 | .033* | 33 |

*Aluminum surface appears frosted
Proprietary Compounds manufactured by:
[1]Turco Prod., Div. Purex Corp. Carson, California
[2]Wyandotte Chemical Corporation Wyandotte, Michigan
[3]Fiber-resin Co. Burbank, California
[4]Oakite Products Co. New York, N.Y.
[5]Oakite Products Co. New York, N.Y.

From the foregoing screening tests it is apparent that a remarkably good result, in terms of maximizing phenolic etch rate and minimizing damage and etching of the aluminum occurs with the aqueous nitric acid-sodium dichromate solvent systems and the aqueous nitric acid-chromium trioxide solution. Two disadvantages of the sodium dichromate as compared to the chromium trioxide solvent solution, however, suggest the use of the chromium trioxide ingredient in the preferred solvent solution for the present specific case of rocket booster casings. These disadvantages were that the nitric acid-sodium dichromate solvent solution takes a relatively greater amount of time to remove the phenolic composite liner than the nitric acid-chromium trioxide solvent solution and that the surfaces of the aluminum alloy immersed in the test solvent solutions containing the sodium dichromate had a somewhat frosty appearance which may have been due to surface etching in the specific instances shown.

Phenolic resin composites are often used where great durability to withstand chemicals and temperature extremes is needed. For instance, aluminum alloy 2014-T6 (as defined by the American Society for Metals in their Metals Handbook, Vol. 1, 8th Ed., 1961 and hereinafter referred to as 2014-T6) rocket booster cases are given an inner liner of an asbestos impregnated phenolic resin composite. The phenolic resin composite in these booster cases is heat and pressure laminated to the metal of the interior surface making a bond with the metal which is capable of withstanding great temperature extremes.

The same characteristic or ability to withstand environmental extremes which serves to maintain the phenolic composite liner during rocket booster case use also serves to preclude the use of many of the methods, processes and solvents of the trade when attempting to remove the phenolic composite liner so that the rocket booster case can be reused. Those solvents and methods which attack the phenolic resin and are used traditionally in the trade to remove such a heat and pressure-bound liner of phenolic resin composite also produce unacceptable corrosion in the form of intergranular attack and end grain pitting of the underlying metallic alloy. Reutilization of the rocket booster cases is possible only when the process of removal of the phenolic liner does not produce intergranular attack exceeding 0.0002 inch, pitting of the alloy does not exceed 0.001 inch and the total etching of the surface does not exceed 0.002 inch.

The preferred embodiment of the present invention utilizes an aqueous solvent mixture of two oxidizing acids $CrO_3$ and $HNO_3$ (without sulfate ions present) in the following approximate proportions:

| | Workable Range | | Preferred Composition | |
|---|---|---|---|---|
| | Wt. % | Mol % | Weight % | Mol. % |
| $CrO_3$ | 1-11 | .3-4.3 | 7 | 3 |
| $HNO_3$ | 60-75 | 30-47 | 62 | 36 |
| $H_2O$ | 24-39 | 53-69 | 31 | 61 |

An alternate embodiment which results in some etching or "frosting" of the aluminum surface utilizes another source of acidic chromium ions, namely sodium dichromate in an aqueous nitric acid solution. For this embodiment the following proportions have been found effective.

|                                      | Workable Range Weight % |
| ------------------------------------ | ----------------------- |
| $Na_2Cr_2O_7 \cdot 2H_2O$            | 9–16                    |
| $HNO_3$                              | 66–71                   |
| $H_2O$                               | 19–20                   |

The rocket booster case with its phenolic composite liner is immersed in a 160°–170° F. bath of either of the foregoing solvent solutions and the synergistic effect of the oxidizing acids at the temperature range mentioned produces the desired reaction of removal of the phenolic resin composite liner from the aluminum booster case with no end grain pitting nor intergranular attack and a maximum total etch of less than 0.002 inch.

Using the chromium oxide containing solutions of the preferred composition at about 160° F., the following results were obtained on test specimens:

| phenolic etch rate | 2.2 mils/side/hour |
| ------------------ | ------------------ |
| aluminum etch rate | .18 mils/side/hour |
| intergranular attack and pitting | none |

In the method of the preferred embodiment the rocket booster case is first aligned on its original tooling axis and the phenolic resin composite liner is machined down to about 0.005 inch thickness. Any loose particles of resin are vacuumed and the resin liner is degreased with a suitable sulfate-free detergent. Prior to immersion of the booster case with phenolic liner in the solvent solution, a chemical milling maskant suitable for withstanding the solution of this process is applied to a depth of 10–20 mils to surfaces which are not to be exposed to the solvent solution.

Ten gallons of the solvent solution in the preferred embodiment is made up in the following manner. Seven quarts of water are heated to 160°–170° F. To this heated water, 8 lbs., 5 oz. of $CrO_3$ is slowly added and allowed to dissolve. Finally, 8 gallons of a 70% by volume solution of $HNO_3$ is added and the entire solvent solution is maintained by either cooling or heating at 160°–170° F.

The rocket booster case with chemical milling maskant applied is immersed in the solvent solution for approximately one hour. The rocket booster case is then removed from the solvent solution and rinsed with a pressurized air-water or air-water-pumice mixture to assist in removal of the remaining parts of the phenolic liner and particularly adherent portions of the asbestos. Residue floating in the solvent solution can be skimmed into an acid waste collection tank.

The steps of immersion in the solvent solution and pressure blasting with air-water or air-water-pumice can be repeated once again if phenolic liner still remains on the surface of the aluminum alloy rocket motor casing or other aluminum alloy substrate. A non-abrasive bristle brush can also be used to assist in removal of the adherent portions of the phenolic liner remaining on the surface. As a final step, the rocket booster case is rinsed thoroughly in water and dried.

For quality control of the solvent solution, its performance in removing the phenolic composite is a good indicator of the efficacy and continued usefulness thereof. Any solvent solution which requires more than two hours to remove 0.005 inch of phenolic should be discarded.

EXAMPLE 1

A scrapped rocket booster case was obtained. The engine nozzles and ancillary holes were sealed with an oven-cured silicone compound which is manufactured under the brand name of "STB 5-82 Dow Corning Silastic E", by Dow Corning Co., Midland, Michigan 48640. The exterior was covered with four coats, approximately 0.012–0.020 inch of a chemical milling maskant such as Adcoat 828, a solvent-based vinyl composition used for masking in chemical milling operations, manufactured by Adcoat Corporation, Los Angeles, California. The solvent solution used was made up in 10-gallon quantities by heating 7 quarts of water to 150°–160° F. Eight pounds, 5 ounces of chromium trioxide ($CrO_3$) were slowly added and stirred until completely dissolved. Eight gallons of technical grade 70% nitric acid were then added with constant, vigorous stirring. The solvent area was well ventilated and protective equipment was used to prevent injuries. The solution thus prepared was heated to 160° F. and poured into the booster case, suspended inside a small stainless steel tank for safety and handling reasons. Metal and phenolic test specimens were immersed in the solvent solution.

Exothermic reaction caused solution temperature to increase to 168° F.; however, after 35 minutes the temperature started down. No external heat was supplied. After one hour, the temperature was 155° F., the solution was poured off and the booster case rinsed inside and out.

Only a few specks of phenolic asbestos liner compound remained plus the part of the insulating cap in the booster rocket nozzle sockets which had been covered by the silicone sealer. Five more minutes immersion would have removed all exposed liner material.

The following results were obtained on the test specimens immersed in the solvent solution during the foregoing test:

| phenolic etch rate | 2.2 mils/side/hour |
| ------------------ | ------------------ |
| aluminum etch rate | .18 mils/side/hour |
| intergranular attack and pitting | none |

After ultrasonic determination of wall thickness the booster case was sawed in two lengthwise. A two-inch square test piece was removed and immersed in the working solution for one more hour.

The etch rates on the phenolic composite resin and aluminum were such that 0.005 inch of phenolic and up to 0.0004 inch of aluminum were removed.

EXAMPLE 2

Two hundred grams of chromium trioxide were slowly added to one liter of 70% by volume of nitric acid. This solvent solution was stirred slowly until all the chromium trioxide was dissolved. The solvent solution was maintained at approximately 160° F. during the entire process by both exothermic reaction and by the application of heat and/or cooling of the tank.

Small segments of 2014-T6 aluminum approximately 0.120×2×2 inches along with coupons of a phenolic resin composite approximately 0.016×1×2 were immersed in the solvent solution for one hour. Specimen weight loss was used to calculate etch rates. It was found that the solvent solution removed 3.7 mils of phenolic composite resin per side, per hour and removed 0.16 mil of aluminum per side, per hour. The ratio of phenolic to aluminum alloy removal was found to be 23 to 1 for this solvent solution.

EXAMPLE 3

One hundred fifty grams of chromium trioxide were slowly added to one liter of 70% by volume of nitric acid. This solvent solution was stirred slowly until all the chromium trioxide was dissolved. The solvent solution was maintained at approximately 150° F. during the entire process by both exothermic reaction and by the application of heat and/or cooling of the tank.

Small segments of 2014-T6 aluminum approximately 0.120×2×2 inches along with coupons of a phenolic resin composite approximately 0.016×1×2 were immersed in the solvent solution for one hour. Specimen weight loss was used to calculate etch rates. It was found that the solvent solution removed 5.0 mils of phenolic resin composite per side, per hour and had removed 0.15 mil of aluminum per side, per hour. The ratio of mils of phenolic removal to mils of aluminum alloy removal was found to be 33 to 1 for this solvent solution.

EXAMPLE 4

One hundred grams of chromium trioxide were slowly added to one liter of 70% by volume of nitric acid. This solvent solution was stirred slowly until all the chromium trioxide was dissolved. The solvent solution was maintained at approximately 120° F. during the entire process by both exothermic reaction and by the application of heat and/or cooling of the tank.

Small segments of 2014-T6 aluminum approximately 0.120×2×2 inches along with coupons of a phenolic resin composite approximately 0.016×1×2 were immersed in the solvent solution for one hour. Specimen weight loss was used to calculate etch rates. It was found that the solvent solution removed 2.1 mils of phenolic resin composite per side, per hour and had removed 0.06 mil of aluminum per side, per hour. The ratio of mils of phenolic removal to mils of aluminum alloy removal was found to be 35 to 1 for this solvent solution.

EXAMPLE 5

One hundred grams of chromium trioxide were slowly added to one liter of 70% by volume of nitric acid. This solvent solution was stirred slowly until all the chromium trioxide was dissolved. The solvent solution was maintained at approximately 160° F. during the entire process by both exothermic reaction and by the application of heat and/or cooling of the tank.

Small segments of 2014-T6 aluminum approximately 0.120×2×2 inches along with coupons of a phenolic resin composite approximately 0.016×1×2 were immersed in the solvent solution for one hour. Specimen weight loss was used to calculate etch rates. It was found that the solvent solution removed 7.5 mils of phenolic resin composite per side, per hour and had removed 0.22 mil of aluminum per side, per hour. The ratio of mils of phenolic removal to mils of aluminum alloy removal was found to be 34 to 1 for this solvent solution.

EXAMPLE 6

Fifty grams of chromium trioxide were slowly added to one liter of 70% by volume of nitric acid. This solvent solution was stirred slowly until all the chromium trioxide was dissolved. The solvent solution was maintained at approximately 155° F. during the entire process by both exothermic reaction and by the application of heat and/or cooling of the tank.

Small segments of 2014-T6 aluminum approximately 0.120×2×2 inches along with coupons of a phenolic resin composite approximately 0.016×1×2 were immersed in the solvent solution for one hour. Specimen weight loss was used to calculate etch rates. It was found that the solvent solution removed 3.3 mils of phenolic resin composite per side, per hour and had removed 0.18 mil of aluminum per side, per hour. The ratio of mils of phenolic removal to mils of aluminum alloy removal was found to be 18 to 1 for this solvent solution.

EXAMPLE 7

Twenty-five grams of chromium trioxide were slowly added to one liter of 70% by volume of nitric acid. This solvent solution was stirred slowly until all the chromium trioxide was dissolved. The solvent solution was maintained at approximately 110° F. during the entire process by both exothermic reaction and by the application of heat and/or cooling of the tank.

Small segments of 2014-T6 aluminum approximately 0.120×2×2 inches along with coupons of a phenolic resin composite approximately 0.016×1×2 were immersed in the solvent solution for one hour. Specimen weight loss was used to calculate etch rates. It was found that the solvent solution removed 1.7 mils of phenolic resin composite per side, per hour and had removed 0.045 mil of aluminum per side, per hour. The ratio of mils of phenolic removal to mils of aluminum alloy removal was found to be 38 to 1 for this solvent solution.

EXAMPLE 8

Twenty-five grams of chromium trioxide were slowly added to one liter of 70% by volume of nitric acid. This solvent solution was stirred slowly until all the chromium trioxide was dissolved. The solvent solution was maintained at approximately 150° F. during the entire process by both exothermic reaction and by the application of heat and/or cooling of the tank.

Small segments of 2014-T6 aluminum approximately 0.120×2×2 inches along with coupons of a phenolic resin composite approximately 0.016×1×2 were immersed in the solvent solution for one hour. Specimen weight loss was used to calculate etch rates. It was found that the solvent solution removed 2.2 mils of phenolic resin composite per side, per hour and had removed 0.17 mil of aluminum per side, per hour. The ratio of mils of phenolic removal to mils of aluminum alloy removal was found to be 13 to 1 for this solvent solution.

EXAMPLE 9

Fifty grams of sodium dichromate were slowly added to one liter of 70% by volume of nitric acid. This solvent solution was stirred slowly until all the sodium dichromate was dissolved. The solvent solution was maintained at approximately 105° F. during the entire process by both exothermic reaction and by the application of heat and/or cooling of the tank.

Small segments of 2014-T6 aluminum approximately 0.120×2×2 inches along with coupons of a phenolic resin composite approximately 0.016×1×2 were immersed in the solvent solution for one hour. Specimen weight loss was used to calculate etch rates. It was found that the solvent solution removed 1 mil of phenolic resin composite per side per hour and had removed 0.017 mil of aluminum per side per hour. The ratio of mils of phenolic removal to mils of aluminum alloy removal was found to be 60 to 1 for this solvent solution.

Though the ratio of phenolic composite removal to aluminum alloy removal was favorable for this solvent solution, this solution had the disadvantages of removing phenolic at a relatively slower rate than the solvent solutions of Examples 1–7 and there also appeared to be some possible etching of the exposed aluminum surfaces.

EXAMPLE 10

Fifty grams of sodium dichromate were slowly added to one liter of 70% by volume of nitric acid. This solvent solution was stirred slowly until all the sodium dichromate was dissolved. The solvent solution was maintained at approximately 160° F. during the entire process by both exothermic reaction and by the application of heat and/or cooling of the tank.

Small segments of 2014-T6 aluminum approximately 0.120×2×2 inches along with coupons of a phenolic resin composite approximately 0.016×1×2 were immersed in the solvent solution for one hour. Specimen weight loss was used to calculate etch rates. It was found that the solvent solution removed 1.7 mils of phenolic resin composite per side per hour and had removed 0.29 mil of aluminum per side per hour. The ratio of mils of phenolic removal to mils of aluminum alloy removal was found to be 6 to 1 for this solvent solution.

This solvent solution at this temperature did increase the removal rate of phenolic composite over the sodium dichromate solutions of Examples 8 and 10; however, the exposed aluminum surfaces appeared etched and the exposed aluminum surfaces were removed at a much faster rate than with this same solution at lower temperatures.

EXAMPLE 11

One hundred grams of sodium dichromate were slowly added to one liter of 70% by volume of nitric acid. This solvent solution was stirred slowly until all the sodium dichromate was dissolved. The solvent solution was maintained at approximately 105° F. during the entire process by both exothermic reaction and by the application of heat and/or cooling of the tank.

Small segments of 2014-T6 aluminum approximately 0.120×2×2 inches along with coupons of a phenolic resin composite approximately 0.016×1×2 were immersed in the solvent solution for one hour. Specimen weight loss was used to calculate etch rates. It was found that the solvent solution removed 0.8 mil of phenolic resin composite per side per hour and had removed 0.040 mil of aluminum per side per hour. The ratio of mils of phenolic removal to mils of aluminum alloy removal was found to be 20 to 1 for this solvent solution.

With the solvent solution of this Example, as with the solvent solution of Examples 8 and 9, there appeared to be a frosty etching of the exposed aluminum surface and the rate of phenolic composite removal was deemed too slow for the immediate purpose.

EXAMPLE 12

Enough sodium dichromate was slowly added and mixed to one liter of 70% by volume of nitric acid to form a saturated solution. The solvent solution was maintained at approximately 150° F. during the entire process by both exothermic reaction and by the application of heat and/or cooling of the tank.

Small segments of 2014-T6 aluminum approximately 0.120×2×2 inches along with coupons of a phenolic resin composite approximately 0.016×1×2 were immersed in the solvent solution for one hour. Specimen weight loss was used to calculate etch rates. It was found that the solvent solution removed 1.1 mil of phenolic resin composite per side per hour and had removed 0.033 mil of aluminum per side per hour. The ratio of mils of phenolic removal to mils of aluminum alloy removal was found to be 33 to 1 for this solvent solution.

Although the composition and process of the invention has been described for use in removing a heat and pressure laminated phenolic resin composite from the aluminum alloy of rocket booster casing it may also be used in removing other type of organic liners or coatings from aluminum alloy substrates, wherein the corrosion or etching of the aluminum alloy substrate must be minimized.

We claim:

1. A process for removing the phenolic resin coating from a phenolic resin coated aluminum object, comprising the steps of:
    applying an aqueous solvent solution consisting essentially of from 60 to 76% by weight of $HNO_3$ and from 2 to 11% by weight of $CrO_3$ to the phenolic resin coating,
    maintaining said solvent solution at a temperature of about 160° to 170° F. for a sufficient time to dissolve said phenolic coating, and
    rinsing with water to remove the solution and drying.

2. The process of claim 1 wherein said phenolic resin coating comprises an asbestos impregnated phenolic resin liner for a conduit.

3. The process of claim 1 wherein said phenolic resin coating comprises a heat and pressure laminated asbestos impregnated phenolic resin liner for a conduit.

4. The process of claim 1 wherein the phenolic resin coating is first machined to a thickness of about 0.005 inch or under.

5. The process of claim 2 wherein any grease or oil present on said phenolic resin coating is first removed with sulfate-free cleaning agent.

6. The process of claim 1 wherein a chemical maskant resistant to said solvent solution is used to mask surfaces and small holes on which no phenolic resin coating exists.

7. The process of claim 2 wherein said object is immersed for one hour in a solution maintained at 160° to 170° F.

8. The process of claim 2 and the steps of:
    removing said object from said solvent solution after about one hour,
    rinsing said solution from the surface of said object, and
    removing any remaining residue from the surface of said object by impinging a high pressure stream of water thereon.

9. A process for removing a phenolic coating from an aluminum substrate, comprising the steps of:

applying an aqueous acidic solvent solution consisting essentially of from about 0.01 to 0.12 moles hexavalent chromium, and from about 1 to 1.7 moles water for each mole HNO₃ to the phenolic coating, maintaining said solution in contact with said phenolic coating at a temperature in the range of 100° to 180° F. for a time sufficient to remove said coating, and rinsing said solution from the aluminum substrate.

* * * * *